United States Patent [19]

Albizzati et al.

[11] Patent Number: 5,391,672
[45] Date of Patent: Feb. 21, 1995

[54] ALPHA-OLEFIN POLYMERS WITH SYNDIOTACTIC STRUCTURE

[75] Inventors: Enrico Albizzati, Arona; Luigi Resconi, Milan; Adolfo Zambelli, Portici, all of Italy

[73] Assignee: Himont Incorporated

[21] Appl. No.: 70,648

[22] Filed: Jun. 1, 1993

Related U.S. Application Data

[63] Continuation of Ser. No. 958,591, Oct. 8, 1992, abandoned, which is a continuation of Ser. No. 485,927, Feb. 27, 1990, abandoned.

[30] Foreign Application Priority Data

Feb. 28, 1989 [IT] Italy .................................. 19578 A/89

[51] Int. Cl.$^6$ .................... C08F 210/14; C08F 210/08
[52] U.S. Cl. .................... 526/348.4; 526/160; 526/348; 526/348.2; 526/348.6
[58] Field of Search .............. 526/160, 348, 348.6, 526/348.2, 348.4

[56] References Cited

U.S. PATENT DOCUMENTS

| | | | |
|---|---|---|---|
| 4,791,180 | 12/1988 | Turner | 526/160 |
| 4,892,851 | 1/1990 | Ewen et al. | 526/160 X |
| 5,157,092 | 10/1992 | Asanuma et al. | 526/348.4 |
| 5,187,250 | 2/1993 | Asanuma et al. | 526/348.6 |

FOREIGN PATENT DOCUMENTS 0524624 1/1993 European Pat. Off. .

*Primary Examiner*—Fred Teskin
*Attorney, Agent, or Firm*—Bryan Cave

[57] ABSTRACT

Syndiotactic polymers of alpha-olefins selected from the group consisting of 1-butene, 4-methyl-1-pentene and 4-methyl-1-hexene and a method of preparation thereof by polymerizing said olefins with catalysts obtained from specific Zr or Hf cyclopentadienyl compounds and aluminoxane compounds.

7 Claims, 7 Drawing Sheets

ALPHA-OLEFIN POLYMERS WITH SYNDIOTACTIC STRUCTURE

This application is a continuation of application Ser. No. 07/958,591, filed Oct. 8, 1992, now abandoned, which is a continuation of application Ser. No. 07/485,927, filed Feb. 27, 1990, now abandoned.

This invention relates to new stereoregular crystalline polymers of alpha-olefins, wherein the recurring units represented by:

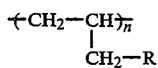   (I)

where R=CH$_3$,

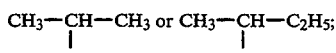

and n is an integer higher than 10, preferably higher than 50; at least for segments formed of more than 10 monomer units, have the syndiotactic structure.

Isotactic crystalline polymers may be obtained by polymerizing 1-butene, 4-methyl-1-pentene, and 4-methyl-1-hexene in the presence of heterogeneous catalysts of the Ziegler-Natta type including, for example, the reaction product of titanium halides with aluminum organometallic compounds.

Partially syndiotactic amorphous 1-butene polymers have been obtained by polymerizing the monomer with the VCl$_4$—Al(C$_2$H$_5$)$_2$Cl catalytic system at −90° C. [A. Zambelli et al.: Makromol Chem. 115,73 (1968)], or by hydrogenating the syndiotactic poly-1,2-butadiene obtained by polymerizing 1,3-butadiene with catalysts which are the reaction product of organic compounds of titanium, vanadium, chromium, or molybdenum with aluminum trialkyls [G. Natta et al.: Atti Accad. naz. Lincei, Rend. Cl. Sci. fisiche mat. natur. Sez. VIII 28,452 (1960)].

These polymers, however, present a number of steric as well as structural irregularities, the latter due to a partial head-to-head and tail-to-tail linking of the vinyl group and to the presence of units linked 1–4 in the syndiotactic poly-1,2-butadiene, which hinder the crystallization of the polymer.

Crystalline syndiotactic propylene and 1,3-butadiene polymers have been obtained, in the case of propylene, with catalysts prepared from VCl$_4$ and AlEt$_2$Cl and, in the case of butadiene, from halogen free organometallic compounds of titanium, vanadium, molybdenum or chromium, and aluminum organometallic compounds. By using the catalysts above-mentioned, however, crystalline syndiotactic polymers of 1-butene, 4-methyl-1-pentene, and 4-methyl-1-hexene cannot be obtained. It is also known that propylene polymerizes to syndiotactic polymer with catalysts obtained from isopropyl-(cyclopentadienyl-1-fluorenyl)-zirconium dichloride and polymethyl-alumoxanes [J. A. Ewen et al. J.A.C.S. 110, 6255–56 (1988)]. However, the application of said catalysts to polymerization of higher alpha-olefins, such as 1-butene or 4-methyl-1-pentene, is not known.

Surprisingly it has been found that by using particular catalytic systems it is possible to prepare stereoregular crystalline polymers of 1-butene, 4-methyl-1-pentene and 4-methyl-1-hexene, where the repeating units represented by diagram (I) above are, at least for long polymer segments, syndiotactically enchained.

The catalyst systems that can be used for the preparation of syndiotactic crystalline poly-alpha-olefins of the present invention, include the reaction product of components A and B.

A is an organometallic aluminum compound of the formula:

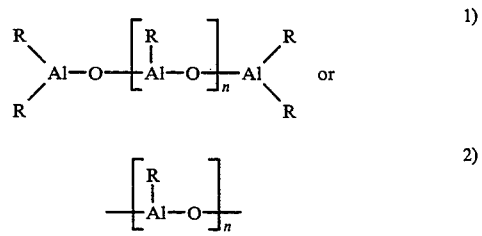

where n in 1) is 0 or an integer from 1 to 40, and in 2) is an integer from 2 to 40; R in both 1) and 2) is an alkyl, aryl, arylalkyl or cycloalkyl radical containing from 1 to 20 carbon atoms.

These aluminum compounds may be used alone or mixed with aluminum trialkyls of aluminium halogen alkyls, where the alkyl groups contain from 1 to 8 carbon atoms; B is an organometallic compound of a transition metal of the formula:

RMX$_2$ 

where R is an isopropyl-(cyclopentadienyl-1-fluorenyl) group;

M=Zr or Hf;

X is halogen, hydrogen an, alkyl, aryl or, arylalkyl radical containing from 1 to 12 carbon atoms, —OR′ (where R′ is an alkyl, aryl or, arylalkyl group containing from 1 to 12 C atoms), —OH, or —CH$_2$—Si(CH$_3$)$_3$ radical, and the X substituents can be the same or different.

Figure 1:
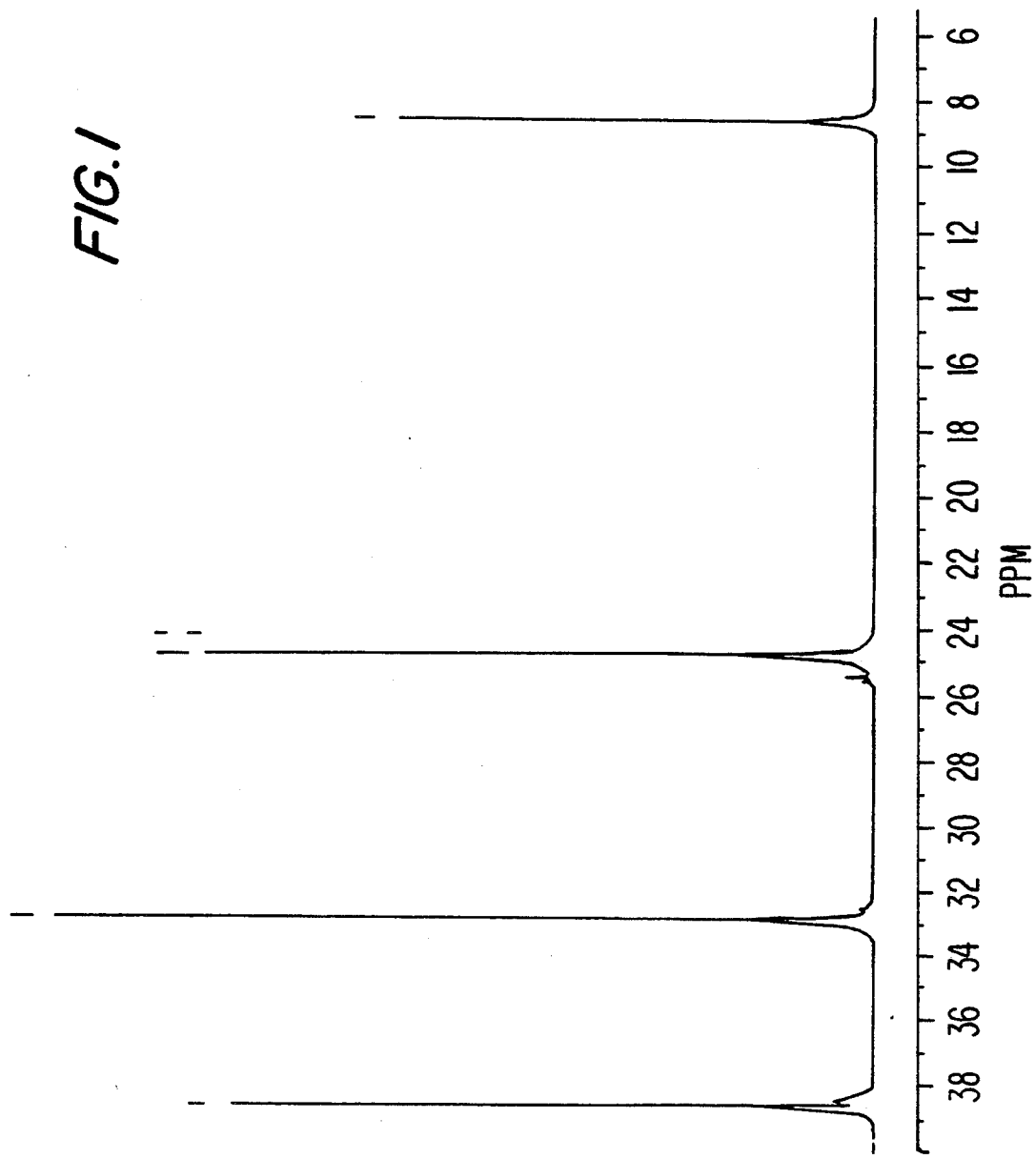
FIG. 1 is the $^{13}$C NMR spectrum of syndiotactic polybutene of the invention.

The stereoregularity of the syndiotactic polybutene obtained with the above-mentioned catalytic systems is evidenced by the $^{13}$C NMR spectrum of the polymer (FIG. 1).

Figure 2:
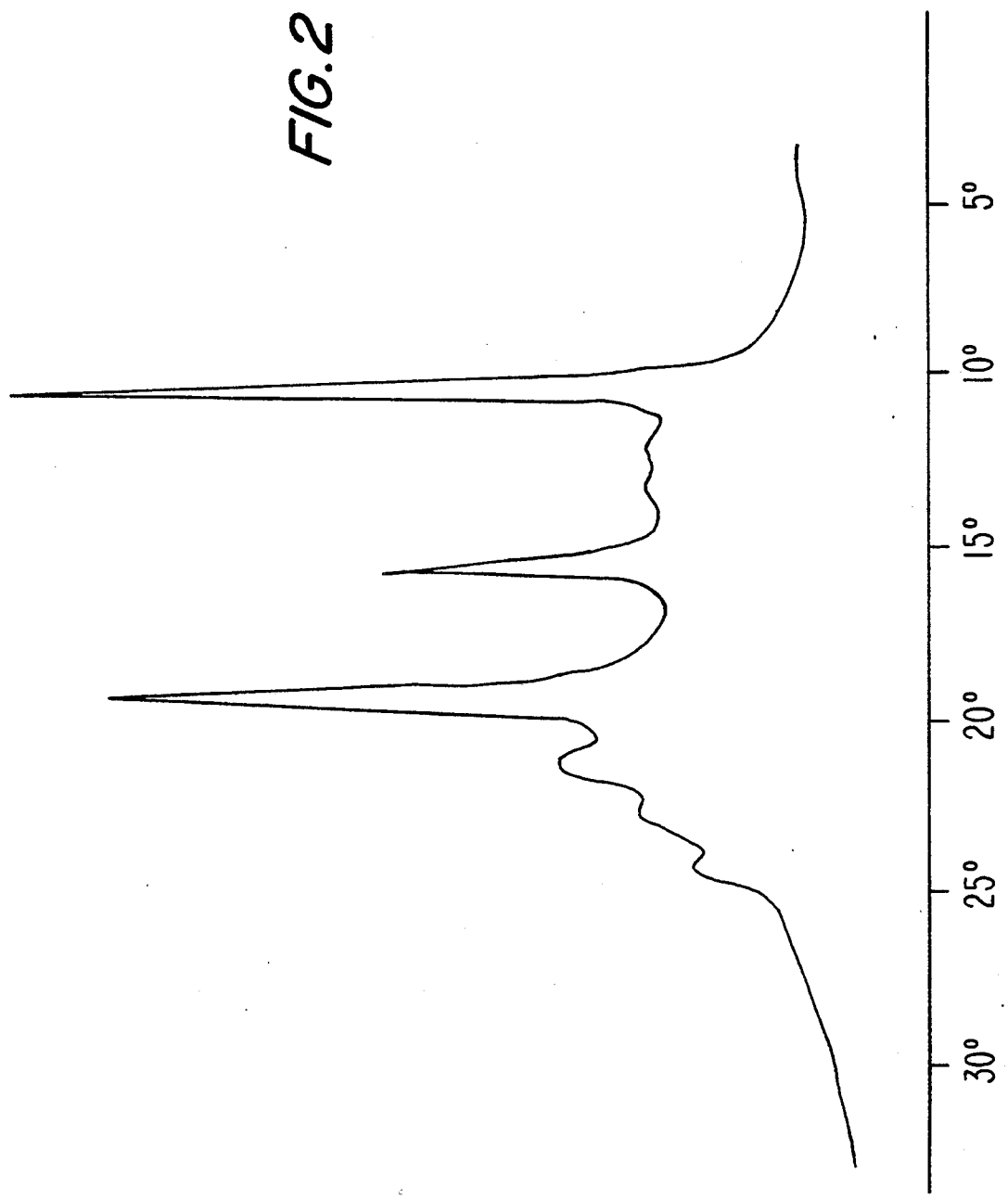
FIG. 2 is the X-ray diffraction spectrum of the syndiotactic polybutene of the invention.

The polymer crystallinity is shown in the X-ray diffraction spectrum (Cu Kα) which shows maxima of diffracted intensity for 2 θ angles of 10.4°, 15.4° and 19.2° (FIG. 2).

Figure 3:
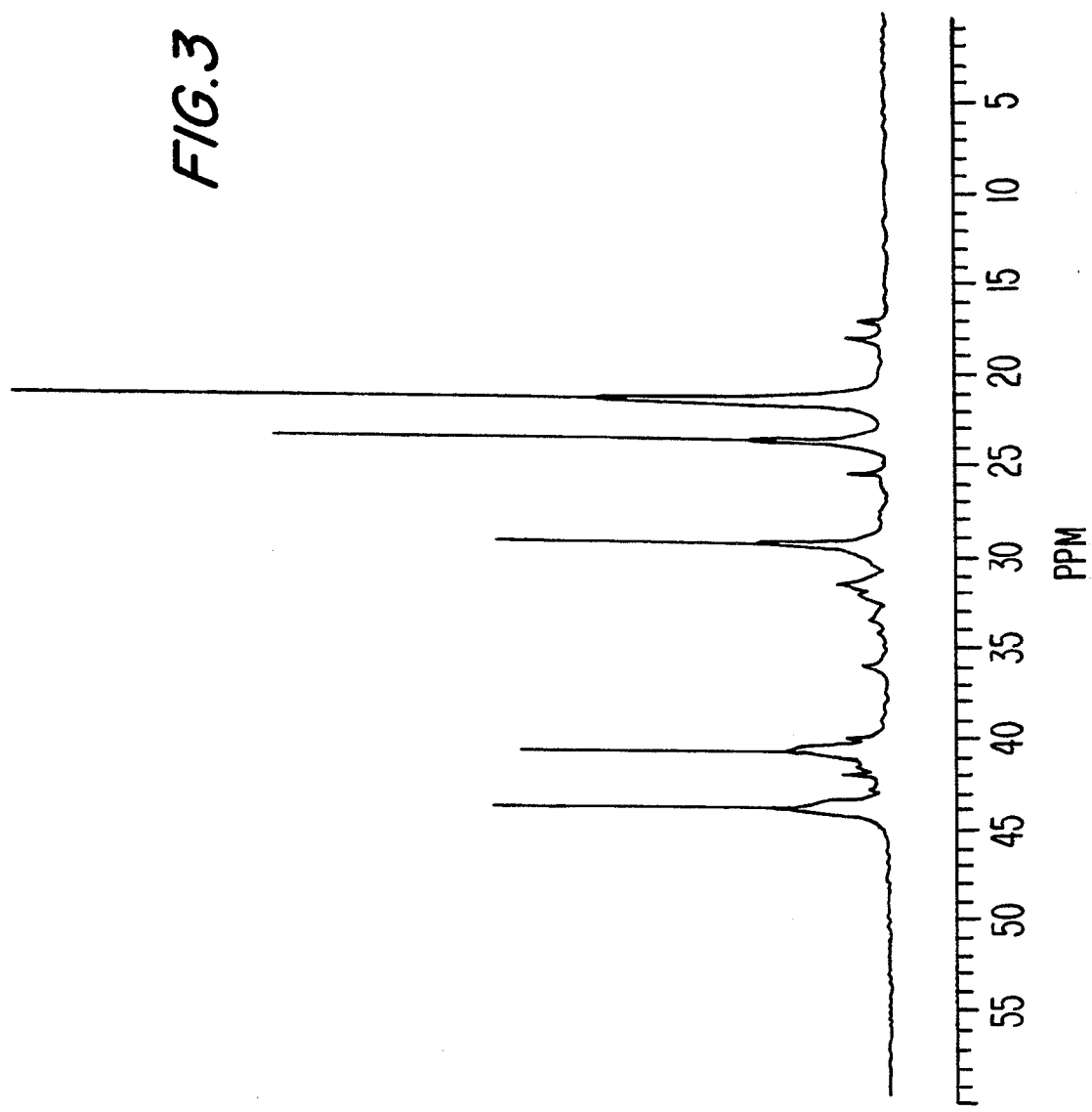
FIG. 3 is the $^{13}$C NMR spectrum of syndiotactic poly-4-methyl-1-pentene of the invention.
Figure 4:
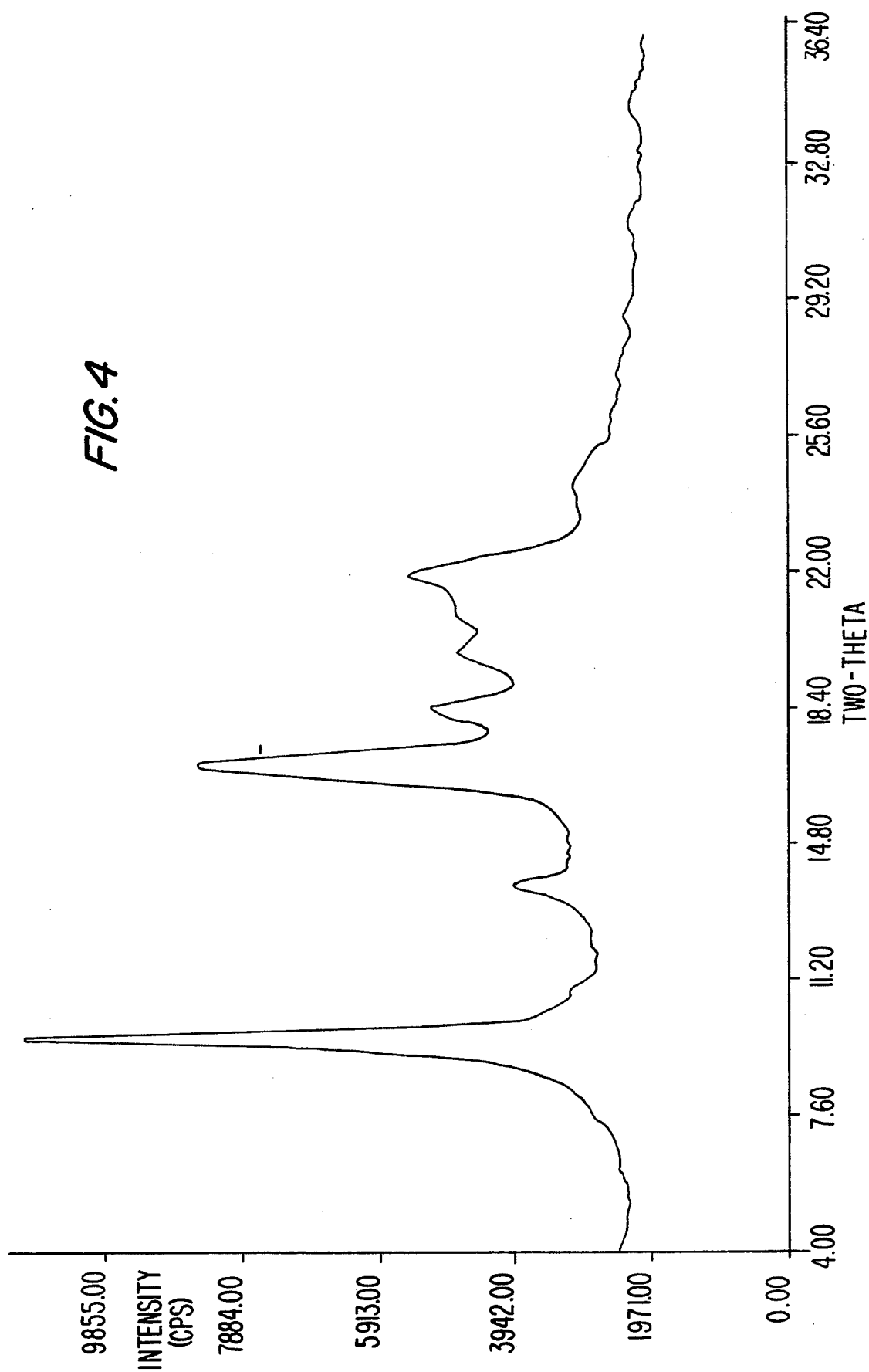
FIG. 4 is the X-ray diffraction spectrum of the syndiotactic poly-4-methyl-1-pentene of the invention.

The stereoregularity of syndiotactic poly-4-methyl-1-pentene is evidenced by the $^{13}$C NMR spectrum of the polymer (FIG. 3 and table 1). The polymer crystallinity is shown in the X-ray diffraction spectrum (Cu Kα)

which shows maxima of diffracted intensity for 2 θ angles of 9.75°, 13.9°, 17.0° and 18.4° (FIG. 4).

Figure 5:
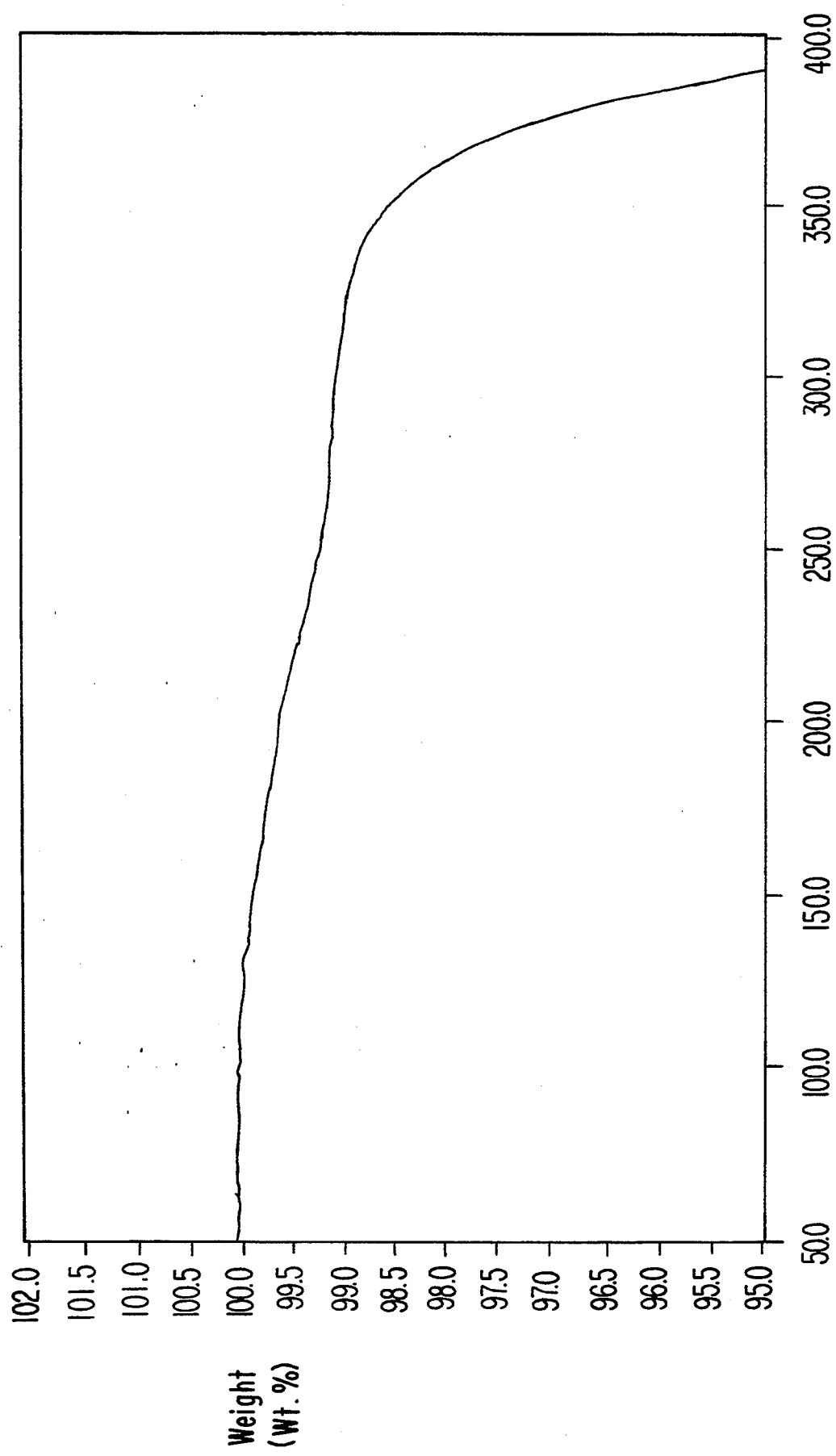
FIG. 5 is the thermal stability curve of syndiotactic poly-4-methyl-1-pentene of the invention.
Figure 6:
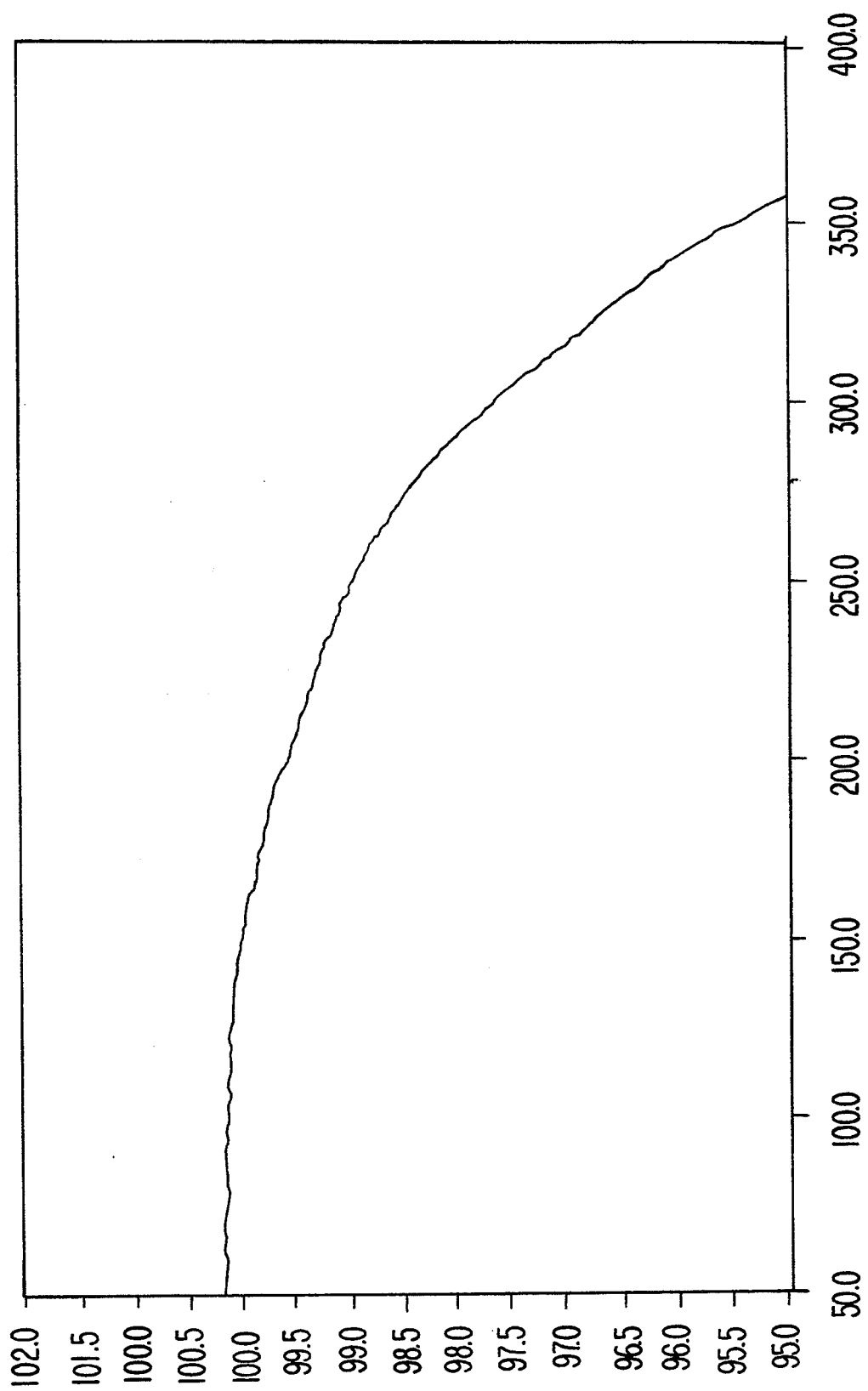
FIG. 6 is the thermal stability curve of isotactic poly-4-methyl-1-pentene.

In FIGS. 5 and 6 are reported the thermal stability curves for the syndiotactic and isotactic polymer, respectively. The syndiotactic polymer, although it has a lower melting point, shows a thermal stability surprisingly superior to the one for the isotactic polymer. This makes the syndiotactic poly-4-methyl-1-pentene a polymer particularly suited for applications requiring a high thermal stability.

The syndiotactic poly-4-methyl-1-pentene may also be obtained through hydrogenation of the syndiotactic poly-1,2-(4-methyl-1,3-pentadiene) prepared by using catalysts obtained from polymethulalumoxane and tetrabenzyl titanium.

Figure 7:
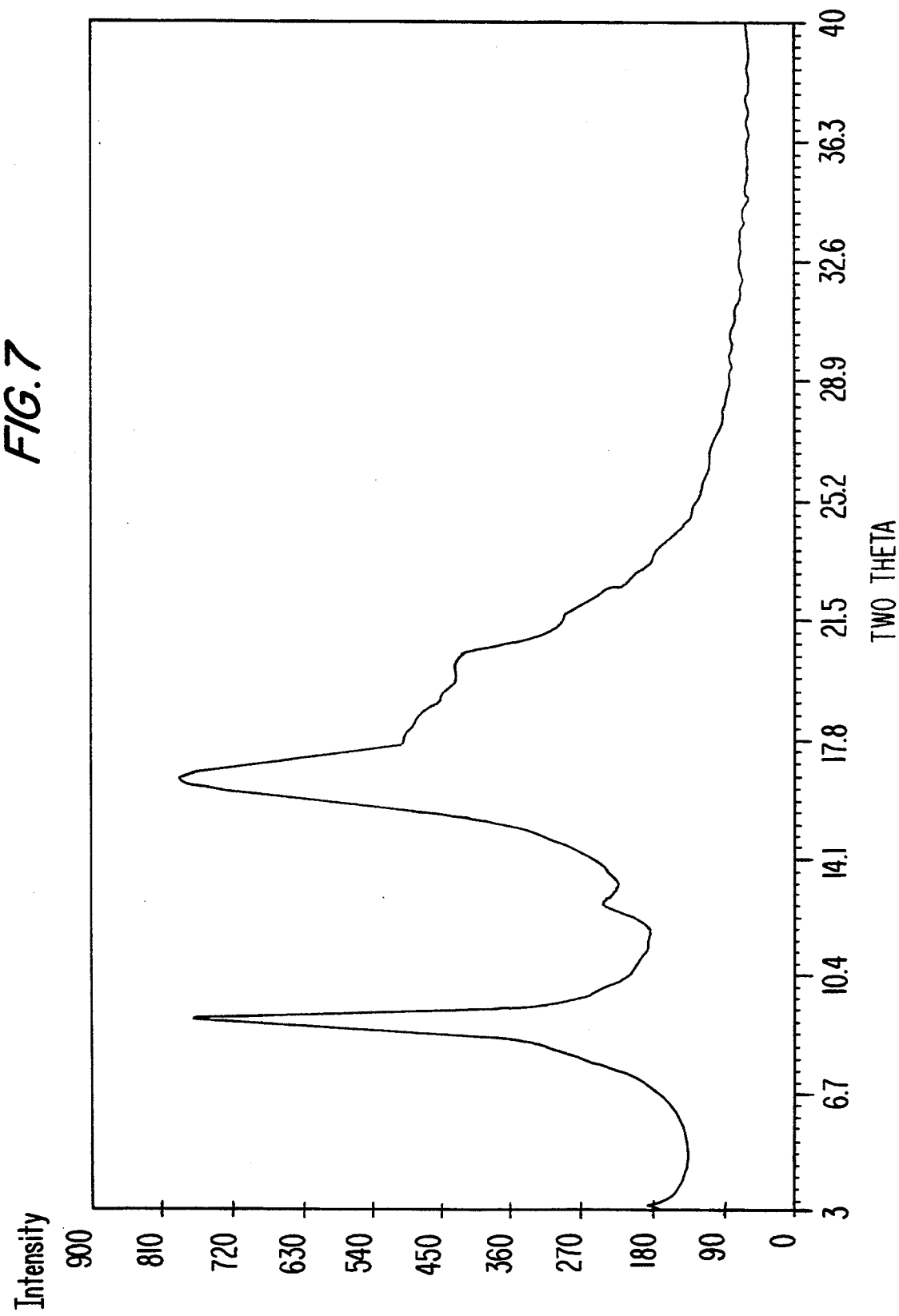
FIG. 7 is the X-ray diffraction spectrum of syndiotactic poly-4-methyl-1-hexene.

The stereoregularity of the poly-4-methyl-1-hexene is evidenced by the $^{13}C$ NMR spectrum of the polymers. The crystallinity is shown in the X-ray diffraction spectra (Cu Kα) which show maxima of diffracted intensity for 2 θ angles of 8.9°, 12.75° and 16.5° (FIG. 7)

The $^{13}C$ NMR spectra were done at 120° C. The samples were prepared by melting the polymers in tetrachloro-1,2-dideuteroethane.

The chemical shift-scale refers to the hexamethyldisiloxane (δ=0).

The syndiotactic crystalline polymers of the invention find application in the field of thermoplastic materials. In particular, as already indicated, the 4-methyl-1-pentene polymers are suited for applications requiring elevated thermal stability.

The following examples are given in order to illustrate the invention, without limiting the scope of same.

TABLE 1

$^{13}C$ NMR chemical shifts[a] of the poly-4-methyl-1-pentene signals relative to carbon atoms numbered in the formula:

$$+^1CH_2-^2CH+_n$$
$$|$$
$$^3CH_2$$
$$|$$
$$^4CH$$
$$^6/ \backslash^5$$
$$H_3C \quad CH_3$$

| carbon | chemical shifts |
|--------|-----------------|
| 1 | 40.60 |
| 2 | 29.14 |
| 3 | 43.63 |
| 4 | 23.57 |
| 5 | 21.30 |

[a]The chemical shifts relate to hexamethyldisiloxane (δ = 0). The spectra of the samples were done at 120° C. in tetrachloro-1,2-dideuteroethane.

EXAMPLE 1

In a 100 ml glass autoclave were introduced under nitrogen atmosphere, 25 ml of toluene and 1 ml of a 10% by weight solution of polymethylalumoxane (MAO) in toluene (Shering). The ingredients were cooled to 0° C. and 20 ml of 1-butene were introduced; then a mixture of 2 ml of MAO and 2 mg of isopropyl(-cyclopentadienyl-1-fluorenyl)zirconium dichloride was added. The reaction mixture was agitated for 18 hours at 0° C. After treatment with methanol acidified with hydrochloric acid, filtration, washing with methanol and drying, 12.1 g of polymer were isolated; X-ray analysis showed that this polymer was crystalline (FIG. 2).

EXAMPLE 2

In a 50 ml glass reactor were introduced, under nitrogen atmosphere, 9 ml of MAO Shering solution (10% by weight), 3 mg of isopropyl(cyclopentadienyl-1-fluorenyl)zirconium dichloride and 15 ml of 4-methyl-1-pentene.

The reaction mixture was agitated for 17 hours at 20° C. Operating according to the procedure of example 1, 7.5 g of polymer were isolated; an X-ray analysis showed that this polymer was crystalline (FIG. 4).

By a differential thermal analysis the polymer showed a melting point of 196.6° C.

EXAMPLE 3

In a 50 ml glass reactor were introduced, under nitrogen atmosphere, 8 ml of toluene, 8 ml of 4-methyl-1-hexene and 5 ml of toluene solution containing 155 mg of polymethylalumoxane and 2.1 mg of isopropyl(cyclopentadienyl-1-fluorenyl)zirconium dichloride. The reaction mixture was agitated for 20 hours at 20° C. Operating according to the procedure of example 1, 1.61 g of polymer were isolated; X-ray analysis showed that this polymer was crystalline (FIG. 7).

By a differential thermal analysis the polymer showed a melting point of 146.6° C.

EXAMPLE 4

5 ml of benzene, 0.1 mole of 4-methyl-1,3-pentadiene, 0.6 mmole of polymethylaluminoxane and 0.005 mmole of titanium tetrabenzyl were introduced in a 250 ml vial at 20° C. and maintained in contact for 72 hours at such temperature.

0.5 g of syndiotactic poly-1,2-(4-methyl-1,3-pentadiene) was obtained.

EXAMPLE 5

0.5 g of poly-1,2-(4-methyl-1,3-pentadiene), prepared according to the procedure of example 4, was dissolved in 50 ml of n-octane and 0.5 ml of 1,2,4-trichlorobenzene, and hydrogenated in an oscillating autoclave in the presence of 0.5 g of Pd supported on carbon (10% by weight) at 45 atm of hydrogen for 72 hours at a temperature of 150° C. The solution was then filtered on silica, and the hydrogenated polymer recovered by coagulation with ethanol.

An X-ray analysis showed that this polymer was crystalline and a differential thermal analysis showed that it had a melting point of 196.5° C The average molecular weight of the polymer, obtained relative to polystyrene at 135° C. in orthodichlorobenzene, was 176,000.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention and described and claimed.

We claim:

1. A crystalline polymer of 1-butene having a $^{13}C$ NMR chemical shift of 38.5, 32.8, 24.8 and 8.5, 4-methyl-1-pentene having a $^{13}C$ NMR chemical shift of 40.60, 29.14, 43.63, 23.57 and 21.30 or 4-methyl-1-hexene having an X-ray diffraction spectrum having a maxima of diffracted intensity for 2 θ angles of 8.9°, 12.75° and 16.5°, wherein the recurring units represented by:

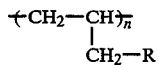

where R is CH₃,

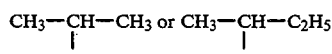

and n is an integer higher than 10, at least for segments formed of more than 10 monomer units have the syndiotactic structure.

2. The polymer of claim 1 wherein said polymer is a poly-4-methyl-1-pentene having a thermal stability greater than 98% at temperature up to 350° C.

3. A manufactured article obtained a polybutene of claim 1.

4. A manufactured article obtained from the poly-4-methyl-1-pentene of claim 2.

5. A manufactured article obtained from the poly-4-methyl-1-hexane of claim 1.

6. A polymer of claim 1 wherein n is an integer higher than 50.

7. A polymer of claim 2 wherein n is an integer higher than 50.